June 20, 1944. E. H. SAGER 2,352,125
SLICING DEVICE
Filed April 7, 1943 2 Sheets-Sheet 1

Inventor
Elmer H. Sager,

Attorneys

June 20, 1944. E. H. SAGER 2,352,125
SLICING DEVICE
Filed April 7, 1943 2 Sheets-Sheet 2
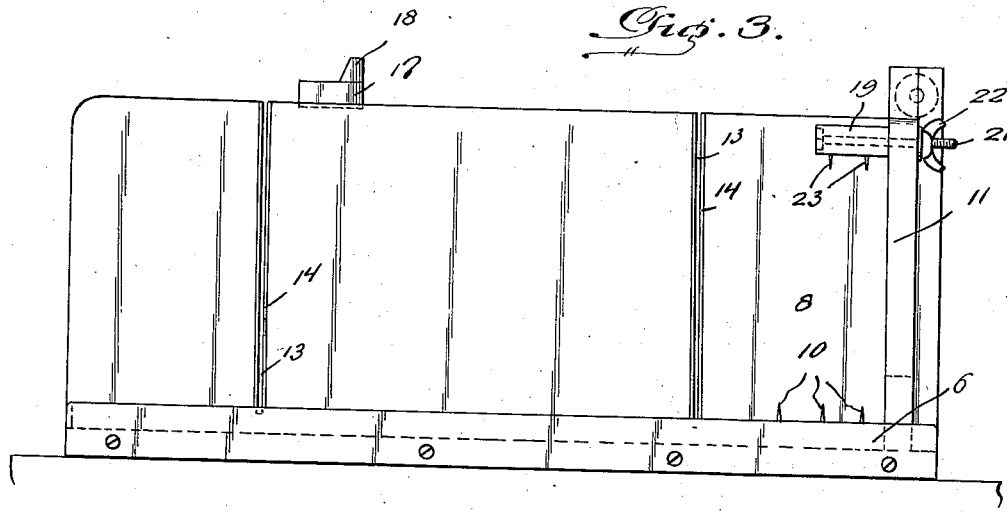
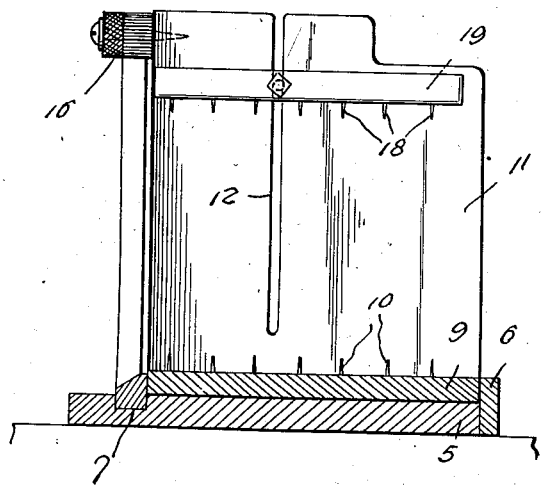
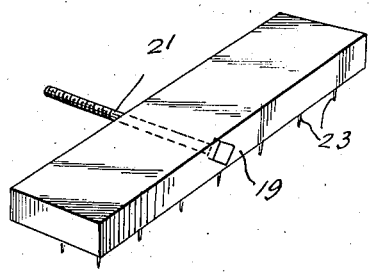
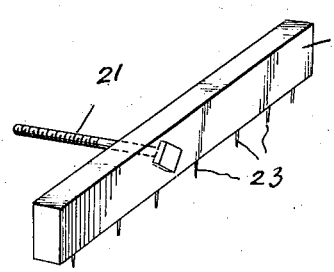
Inventor
Elmer H. Sager,
Attorneys Patented June 20, 1944

2,352,125

UNITED STATES PATENT OFFICE 2,352,125

SLICING DEVICE

Elmer H. Sager, Chicago, Ill.

Application April 7, 1943, Serial No. 482,151

2 Claims. (Cl. 146—150)

This invention relates to a slicing device which will permit a conventional long bladed knife to be used in slicing various food materials, such as bread, boneless meat, cheese, vegetables, etc., into slices of desired thicknesses and securely hold the food material against slippage.

The primary object of the invention is the provision of a device of the above stated character which will be durable, efficient and may be cheaply manufactured from non-essential war materials and will be safe in the slicing of food materials of different kinds and act to guide the cutting movement of the knife and thereby obviate any possibility of the person carrying out the operation becoming injured.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating a slicing device constructed in accordance with my invention.

Figure 3 is a side elevation illustrating the device from the opposite side of that shown in Figure 2.

Figure 4 is a transverse sectional view illustrating the means of securing the food material within the device.

Figure 5 is a perspective view illustrating one of the clamping blocks.

Figure 6 is a perspective view illustrating another clamping block.

Figure 1:
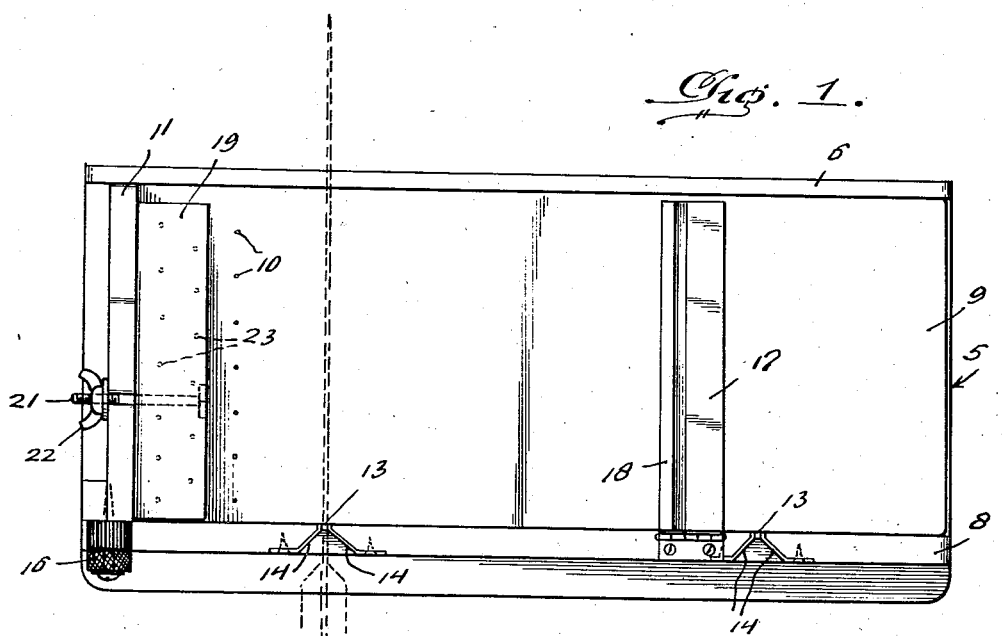
Figure 2:
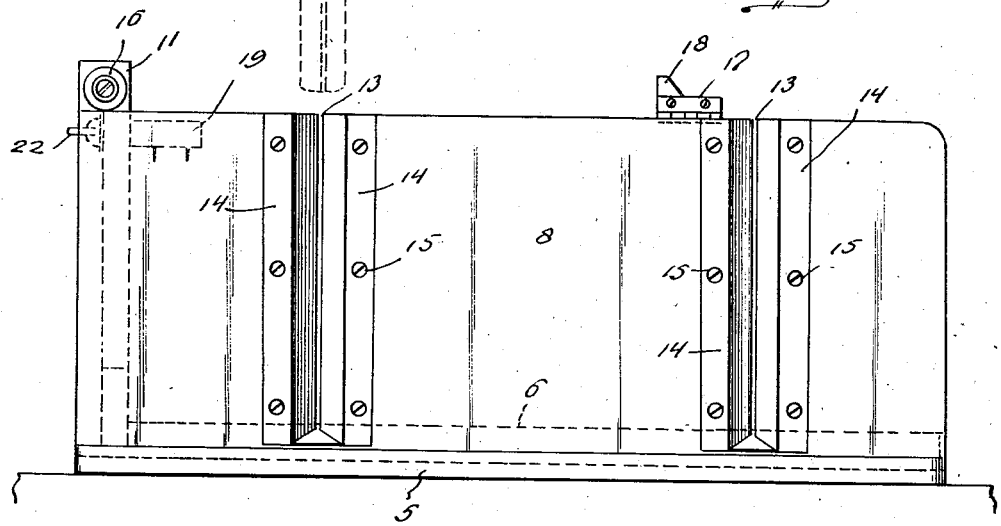
Figure 2 is a side elevation illustrating the device.

Referring in detail to the drawings, the numeral 5 indicates an elongated base or support in the form of a panel which has secured to one longitudinal edge thereof an upstanding guide flange 6. The base 5 adjacent the opposite edge is provided with a groove 7 extending longitudinally thereof and in which is secured a vertically arranged wall 8 also in the form of a panel.

Slidable on the base between the upstanding wall 8 and the flange 6 is a material-carrying plate 9 provided in a portion thereof with upstanding tines 10 to bite into the material positioned on the plate. The tines 10 are preferably arranged in rows with the tines of the rows staggered with the tines of adjacent rows. Also it is to be noted that the rows of tines are located near one end of the plate and said end has secured thereto an upstanding end wall 11 provided with a slot 12. The slot 12 opens outwardly through the upper edge of the end plate 11 and terminates at the other end adjacent the plate.

The side wall 8 is provided with spaced knife receiving slots 13 which open outwardly through the upper edge of the side wall at one end, while the opposite ends terminate below the top face of the plate 9. The purpose of the slots 13 is to receive the blade of a knife for the purpose of guiding the knife in a vertical direction. The outer face of the side wall 8 at opposite sides of the slots 13 is beveled in the direction of said slots to permit the knife blade to extend into the slots for a maximum distance.

The walls of the slots 13 are reinforced by wear plates 14 which also extend over the beveled faces of the wall 8 and are secured thereto by screws or like fasteners 15.

A knurled roller 16 is journaled on the end wall and rides the upper edge of the side wall 8 and provides a finger piece for advancing the end wall along with the plate 9, toward the knife slots 13 or toward one end of the base for the purpose of feeding the food material in the direction of the knife slots after each slice is removed.

A clamping member 17 is hinged on the upper edge of the side wall 8 adjacent one of the knife slots 13 and is beveled to provide a finger rib 18 extending the full length thereof, the puropse of which is to permit a person to obtain a firm grip thereon with the tips of the fingers resting upon the top face of the member 17. It is preferable that the member 17 be located adjacent the knife slots furthest from the end wall so that it can be utilized in clamping the food material on the plate 9 when said food material is of the greatest length.

Clamping blocks 19 and 20, each is provided with a wing nut 22. The clamping blocks 19 and 20 have tines 23. In adapting either of the clamping blocks to the device, the bolt 21 is positioned through the slot 12 in the end wall and the wing nut tightened thereon to engage the end wall retaining the clamping block in tight engagement with the food material on the plate 9 and at one end thereof. It is to be noted that the clamping block 19 has a greater width than the clamping block 20 and is to be utilized when the food material is of considerable length. However, after a number of slices have been removed from the food material to reduce the length, the clamping block 20 is employed so that substantially all of the remaining portion of the food material may be sliced.

It is preferable that the bolts 21 have the heads thereof countersunk in the blocks to prevent the bolts from turning and also from protruding beyond one side edge of the blocks.

The various parts of this device may be constructed of any kind of material suitable for the purpose, preferably of material non-essential to the war purpose.

In use the food material is arranged on the plate with one end against the end wall and the clamping block carried by the end wall is brought into engagement therewith and secured by the wing nut. If the length of the material extends adjacent the knife slot furthest from the end wall, said slot is employed to receive the blade of the knife and the clamping member 17 is brought into clamping position. When the clamping block is applied to the material it forces the material onto the tines of the plate 9, consequently the food material is held against slippage. As the slices are removed from the material the end wall is advanced toward the knife slot being used. When the length of the food material becomes comparatively short, the other knife slot is used to receive the knife. The knife blade moving in either of the knife slots will be guided in a vertical path consequently severing the material into straight slices and by adjusting the end wall relative to the slot the thickness of each slice can thus be regulated.

The non-flanged longitudinal edge of the base extends beyond the side wall 8 and may be engaged by a suitable clamp (not shown) for securing the base on a table or like support.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a slicing device, a base, a material supporting plate slidable on the base, a vertical side wall on said base provided with a vertically arranged knife guide slot, tines on the plate adjacent one end thereof for biting into the material, a vertically arranged end wall secured to said end of the supporting plate to abut one end of the material on the supporting plate, said end plate having a vertical slot, a clamping block including tines and a bolt and nut thereon to engage the material with the bolt arranged in the slot of the end plate, a knurled roller providing a finger piece journaled on the end plate and having riding contact with the upper edge of the side wall.

2. In a slicing device, an elongated flat base, a material supporting plate slidably mounted on the base, a vertically arranged side wall mounted on said base adjacent one edge thereof and having one edge of the plate in sliding contact therewith and provided with spaced knife receiving slots, wear plates for said slots, an end wall secured to one end of the supporting plate and including material clamping means adjustable relative thereto, material clamping means hingedly mounted on the side wall adjacent one of the slots, and a knurled roller journaled on the end wall and having riding contact with the upper edge of the side wall.

ELMER H. SAGER.